(12) United States Patent
Park et al.

(10) Patent No.: US 8,749,805 B2
(45) Date of Patent: Jun. 10, 2014

(54) METHOD AND APPARATUS FOR ALLOWING PACKET IN NETWORK IMAGE FORMING APPARATUS INCLUDES SETTING USER ACCOUNT INFORMATION CORRESPONDING TO PLURALITY OF NETWORK INTERFACES

(75) Inventors: Sung-joon Park, Hwaseong-si (KR); Byoung-yue Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 959 days.

(21) Appl. No.: 12/117,885

(22) Filed: May 9, 2008

(65) Prior Publication Data

US 2009/0002743 A1 Jan. 1, 2009

(30) Foreign Application Priority Data

Jun. 28, 2007 (KR) .................. 10-2007-0064616
Aug. 17, 2007 (KR) .................. 10-2007-0083016

(51) Int. Cl.
*G06K 15/00* (2006.01)
*G06F 3/12* (2006.01)
*H04N 1/00* (2006.01)

(52) U.S. Cl.
USPC ......... 358/1.14; 358/1.15; 358/1.16; 358/402

(58) Field of Classification Search
USPC ............. 358/1.14, 1.15, 1.16, 1.1, 1.13, 402, 358/438, 501, 444, 448; 370/351, 352, 396, 370/237, 379, 367, 355, 287, 254, 428, 466, 370/469, 389, 401; 709/230, 228, 240, 243, 709/201, 223, 238, 245, 250
See application file for complete search history.

(56) References Cited

U.S. PATENT DOCUMENTS

| | | | | |
|---|---|---|---|---|
| 5,636,333 | A * | 6/1997 | Davidson et al. | 358/1.15 |
| 6,256,322 | B1 * | 7/2001 | Wilson, Jr. | 370/469 |
| 6,512,766 | B2 * | 1/2003 | Wilford | 370/389 |
| 6,519,247 | B1 * | 2/2003 | Yoshida | 370/352 |

(Continued)

FOREIGN PATENT DOCUMENTS

| | | |
|---|---|---|
| JP | 2002-215372 | 8/2002 |
| JP | 2004-357234 | 12/2004 |

(Continued)

OTHER PUBLICATIONS

Ryoji, Imaging device and printing limit method for the imaging device, Feb. 8, 2002, Machine Translated Japanese Patent Publication JP2002215372, all pages.*

(Continued)

*Primary Examiner* — Ngon Nguyen
(74) *Attorney, Agent, or Firm* — Staas & Halsey LLP (57) ABSTRACT

A method of allowing a packet in a network image forming apparatus includes setting user account information corresponding to the plurality of network interfaces, determining allowability of a received packet by using information included in the received packet and the set user account information, and when the received packet is allowable, performing an operation corresponding to the received packet. Accordingly, in an image forming apparatus installing a plurality of network interfaces, not only allowability of each interface to each user but also a type of protocol provided to each user can be setup. Consequently, an environment that can use an interface in various forms according to each user can be provided.

19 Claims, 9 Drawing Sheets

(56) References Cited

U.S. PATENT DOCUMENTS

| | | | |
|---|---|---|---|
| 8,156,562 B2 | 4/2012 | Kawase et al. | |
| 2002/0015180 A1* | 2/2002 | Tominaga | 358/1.15 |
| 2005/0120244 A1* | 6/2005 | Choi | 713/201 |
| 2006/0126110 A1* | 6/2006 | Ohara et al. | 358/1.15 |
| 2006/0222352 A1 | 10/2006 | Kawase et al. | |
| 2007/0028232 A1 | 2/2007 | Kim et al. | |
| 2007/0064683 A1* | 3/2007 | Furukawa | 370/352 |
| 2008/0077700 A1* | 3/2008 | Hibino | 709/230 |

FOREIGN PATENT DOCUMENTS

| | | |
|---|---|---|
| JP | 2006-293438 | 10/2006 |
| KR | 10-2004-0038168 | 5/2004 |
| KR | 10-2005-0052962 | 6/2005 |
| KR | 10-544478 | 1/2006 |
| KR | 10-2006-0093265 | 8/2006 |
| KR | 10-2007-0013925 | 1/2007 |
| KR | 10-2007-0053001 | 5/2007 |

OTHER PUBLICATIONS

Javvin Technologies Inc., Network Protocol Handbook, 2004-2005, Javvin Technologies Inc., 2nd Edition, all pages.*

Korean Office Action issued May 31, 2011 in corresponding Korean Patent Application 10-2007-0064616.

Chinese Office Action issued Jan. 30, 2012 in corresponding Chinese Patent Application 2008101254739.

Korean Office Action issued Feb. 28, 2012 in corresponding Korean Patent Application 10-2007-0083016.

Korean Office Action issued Mar. 28, 2012 in corresponding Korean Patent Application 10-2007-0064616.

Korean Notice of Allowance issued Jun. 28, 2012 in corresponding Korean Patent Application 10-2007-0064616.

Chinese Office Action issued Aug. 30, 2012 in corresponding Chinese Patent Application 200810254739.

Notice of Allowance dated Jan. 10, 2013 in Korean Application No. 10-2007-0083016 (5 pages) 1 page partial translation.

Third Chinese Office Action dated Mar. 1, 2013 in Chinese Patent Application No. 200810254739.

Chinese Office Action mailed Aug. 29, 2013 in related Chinese Application No. 200810125473.9.

Chinese Office Action dated Feb. 28, 2014 issued issued in corresponding Chinese Office Action Application No. 200810125473.9.

* cited by examiner

[ SET USER ACCOUNT ]

⊙ USER ID :  Admin
⊙ USER PASSWORD :  ****
⊙ PROTOCOL
  ☑ HTTP
  ☑ SNMP
  ☑ LPD
  ☐ MDNS

⊙ ALLOWABLE INTERFACE
  ☑ INTERFACE 1
  ☐ INTERFACE 2

APPLY

FIG. 3

[ SET USER ACCOUNT ]

⊙ USER ID : | Admin |
⊙ USER PASSWORD : | **** |
⊙ ALLOWABLE INTERFACE AND PROTOCOL
- ☑ INTERFACE 1
  - ☑ HTTP
  - ☑ SNMP
  - ☑ LPD
  - ☑ MDNS
- ☐ INTERFACE 2
  - ☑ HTTP
  - ☐ SNMP
  - ☑ LPD
  - ☐ MDNS

APPLY

FIG. 4

| [ USER ACCOUNT REGISTRATION TABLE ] | | | |
|---|---|---|---|
| USER ID | PASSWORD | PROTOCOL | ALLOWABLE INTERFACE |
| Admin | .... | HTTP<br>SNMP<br>LPD | INTERFACE 1 |
| PowerUser | .... | HTTP<br>SNMP<br>LPD | INTERFACE 1<br>INTERFACE 2 |

| IP Address | 192 | . | 168 | . | 1 | . | 100 |   | IP Address | 192 | . | 168 | . | 1 | . | 101 |
|---|---|---|---|---|---|---|---|---|---|---|---|---|---|---|---|---|

User: 192.168.1.99

00.00.F0.A0.12.34

Security ● NONE   ◉ 802.11i
○ 802.1x   ◉ WPA2

Protocol ☑ HTTPs   ☑ SNMPv3
☐ IPPs   ☐ Printing
☑ Management   ☐ Discovery User:

Security ○ NONE   ◉ 802.11i
● 802.1x   ◉ WPA2

Protocol ☐ HTTPs   ☑ SNMPv3
☑ IPPs   ☑ Printing
☐ Management   ☑ Discovery

FIG. 9

METHOD AND APPARATUS FOR ALLOWING PACKET IN NETWORK IMAGE FORMING APPARATUS INCLUDES SETTING USER ACCOUNT INFORMATION CORRESPONDING TO PLURALITY OF NETWORK INTERFACES

CROSS-REFERENCE TO RELATED APPLICATION

This application claims the benefit of Korean Patent Application Nos. 2007-64616, filed Jun. 28, 2007, and 2007-83016, filed Aug. 17, 2007 in the Korean Intellectual Property Office, the disclosure of which is incorporated herein by reference.

BACKGROUND OF THE INVENTION

1. Field of the Invention

Aspects of the present invention relate to restricting the use of each interface according to each user in an image forming apparatus installing a plurality of network interfaces, and more particularly to a method and apparatus for allowing a packet, which restricts transmission/reception of a packet according to a certain condition, in a network image forming apparatus including at least one network address.

2. Description of the Related Art

In the network printer market, products supporting not only a wired network but also a wireless network are increasing. In order to support various sites using several security policies, a plurality of network interfaces are installed. As such, in a network printer system installing a plurality of network interfaces, the use of a network interface can be diversified according to each user by adding an interface to the authority of each user account.

As applicability of a network in a printer market increases, several network interfaces are being installed in one printer. In an image forming apparatus installing a plurality of network interfaces, security policies or support protocol lists in each interface are differentiated, and thus the image forming apparatus can be suitably operated according to a policy or an object of each website.

A network image forming apparatus installing a plurality of network interfaces differentiates each interface by setting a supported protocol of each interface differently. The reason for differentiating a supported protocol of each interface is because a security level of a network connected to each network may be different. For example, a public network has weaker security than a private network, and a wireless network has weaker security than a wired network. Accordingly, a service that is provided through an interface connected to a network having weak security, is provided only to a user who is authenticated or passed encryption, so that weakness of security in the network can be overcome.

However, a conventional method of restricting a service in each interface is uniformly applied to all users. Using the conventional method, various settings are not possible while setting a possible service to each interface or each user. Accordingly, various security policies of websites cannot be satisfied.

Also, in a network image forming apparatus including a plurality of network addresses, each network address affects operations of the network image forming apparatus. A packet assigned as a valid network address is received at the network image forming apparatus under no restriction, and such a reception operation of a packet affects the operations of the network image forming apparatus. Accordingly, a packet that does not satisfy a security level can be transmitted/received without any restriction when the packet is determined to be a network address, and thus the network image forming apparatus may be weak in security.

SUMMARY OF THE INVENTION

Aspects of the present invention provide a method and apparatus for allowing a packet in a network image forming apparatus, which determines allowability of a packet by using user account information corresponding to each of a plurality of network interfaces, and performs an operation corresponding to a received packet.

Aspects of the present invention also provide a method and apparatus for allowing a packet, which strengthens a security function of each network address, in a network image forming apparatus including a plurality of network addresses.

According to an aspect of the present invention, a method of allowing a packet in a network image forming apparatus including a plurality of network interfaces is provided. The method includes setting user account information corresponding to the plurality of network interfaces; determining allowability of a received packet based on information included in the received packet and the set user account information; and when the received packet is allowable, performing an operation corresponding to the received packet.

According to another aspect of the present invention, an apparatus to allow a packet in a network image forming apparatus is provided. The apparatus includes a plurality of network interfaces to receive a packet; a user interface set user account information corresponding to the plurality of network interfaces; a packet allowance determiner to determine allowability of the received packet based on information included in the received packet and the set user account information; and an operation controller to control performance of an operation corresponding to the received packet according to the result of the determination by the packet allowance determiner.

According to another aspect of the present invention, a method of allowing a packet in a network image forming apparatus including a plurality of network addresses is provided. The method includes checking validity of a received packet; checking a security level of the received packet by referring to a security level set up in the network image forming apparatus; and performing an operation corresponding to the received packet, when the security level of the received packet satisfies the setup security level.

According to another aspect of the present invention, an apparatus to allow a packet in a network image forming apparatus including a plurality of network addresses is provided. The apparatus includes a packet validity checker to determine validity of a received packet; a security level checker to determine a security level of the received packet in response to the result of the determination of the packet validity checker; and a controller to control performance of an operation corresponding to the received packet in response to the result of the determination of the security level checker.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
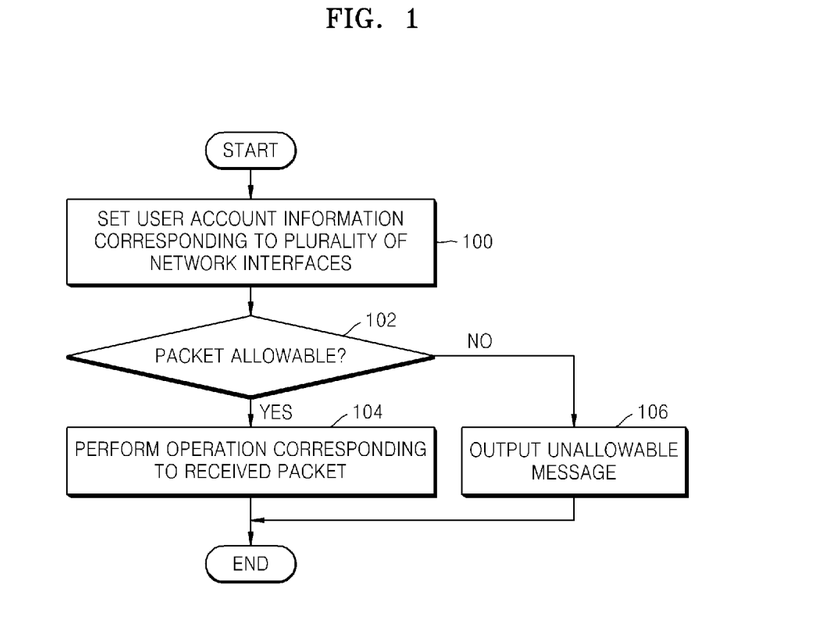
FIG. 1 is a flowchart illustrating a process of allowing a packet in a network image forming apparatus according to an embodiment of the present invention.

FIG. 1 is a flowchart of a process of allowing a packet in a network image forming apparatus according to an embodiment of the present invention. In operation 100, user account information corresponding to a plurality of network interfaces is set. When the plurality of network interfaces (such as a plurality of network cards), is installed in the network image forming apparatus, information about each user who can use each network interface, may be set as the user account information. In the user account information, at least one network interface and protocol that is to be allowed for the corresponding user are set.

Figure 2:
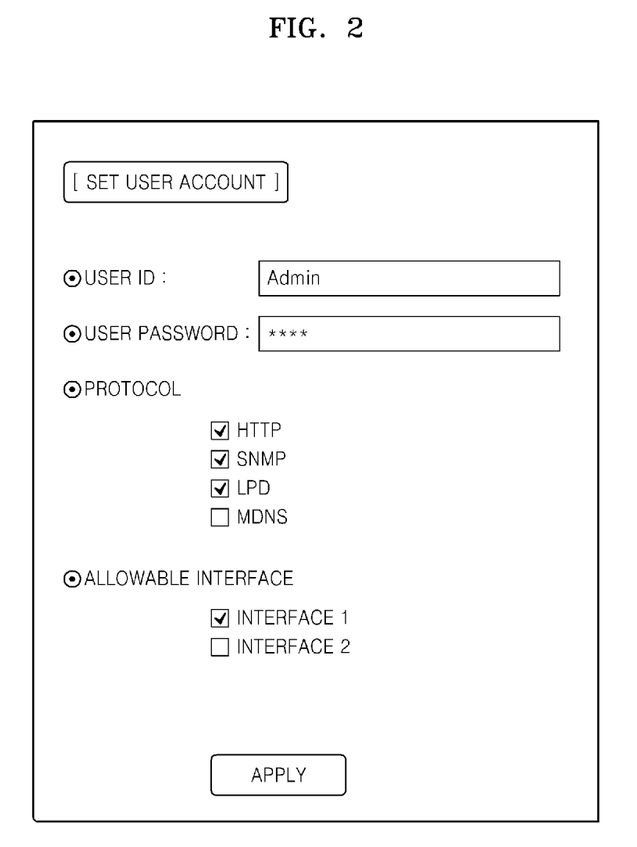
FIG. 2 is a diagram illustrating an account setting screen for setting user account information according to an embodiment of the present invention.

FIG. 2 shows an example of an account setting screen for setting user account information according to an embodiment of the present invention. As shown in FIG. 2, the account setting screen includes items that can set types of an allowable network interface as the user account information. A conventional account setting screen does not include items that enable each user to select types of a network interface as account information. According to aspects of the present invention, such as shown in FIG. 2, a user can select a user ID, a user password, a type of protocol (shown as HTTP, SNMP, LPD, and MDNS), and a type of allowable network interface as the user account information. Corresponding information is registered as the user account information according to the selection of the user. Any type of network interface or protocol may be used according to aspects of the present invention, including interfaces and protocols operating over wired or wireless networks.

Figure 3:
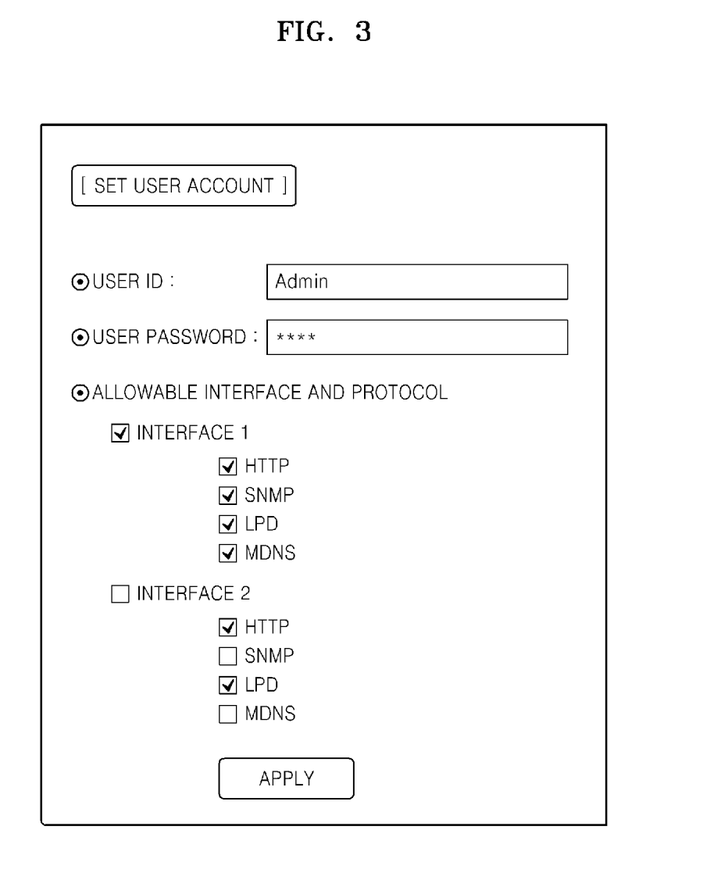
FIG. 3 is a diagram illustrating an account setting screen for setting user account information according to another embodiment of the present invention.

FIG. 3 shows an account setting screen for setting user account information according to another embodiment of the present invention. As shown in FIG. 3, the account setting screen may include items permitting, for each allowable network interface, selection of types of a protocol for the corresponding allowable network interface as the user account information. The user can select a user ID, a user password, an allowable network interface, and a protocol corresponding to the allowable network interface. According to the selection of the user, corresponding information is registered as the user account information. Other information may also be provided in the account setting screen.

Figure 4:
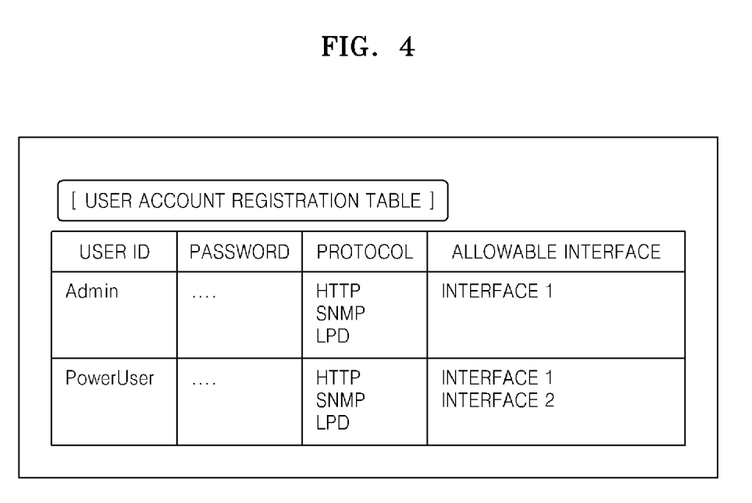
FIG. 4 is a diagram illustrating an account information registration table of each user set by using user account information according to an embodiment of the present invention.

FIG. 4 shows an account information registration table of each user set based on user account information according to an embodiment of the present invention. Information about user IDs, passwords, types of allowable protocols, and types of allowable network interfaces may be stored as a table in the network image forming apparatus. Other account information may also be included in the account information registration table, such as a maximum number of pages that the user is allowed to print.

Returning to FIG. 1, after operation 100, whether a received packet is allowable is determined based on information included in the received packet and the set user account information in operation 102. When the received packet is received to the network image forming apparatus, allowability of the received packet is determined by reading information included in the packet.

Figure 5:
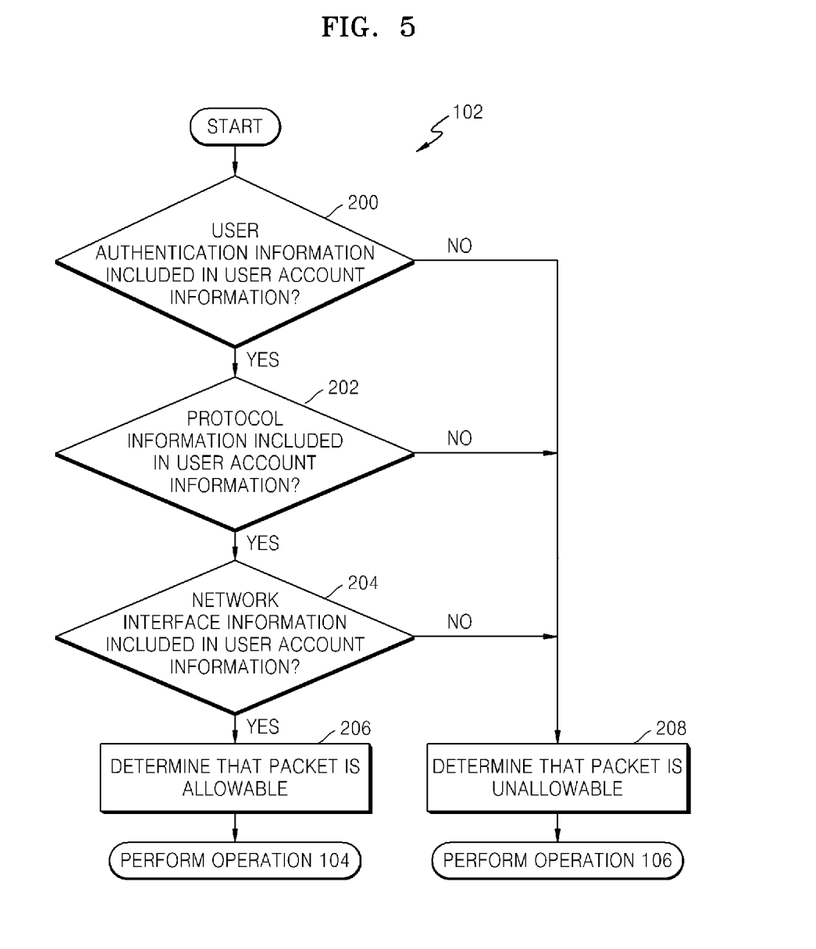
FIG. 5 is a flowchart illustrating in detail operation 102 illustrated in FIG. 1 according to an embodiment of the present invention.

FIG. 5 shows an example of operation 102 in more detail. Whether user authentication information included in the received packet is included in the set user account information is determined in operation 200. For example, whether a user ID and a password corresponding to the user authentication information included in the received packet are identical to user account information pre-set in the network image forming apparatus is determined. Other authentication techniques, such as digital certificates, may also be employed.

If the user authentication information is included in the set user account information in operation 200, whether protocol information included in the received packet is included in the user account information is determined in operation 202. For example, when a user ID included in the received packet is "Admin", whether the protocol information included in the received packet corresponds to any one of protocols "HTTP", "SNMP", and "LPD" corresponding to "Admin" is determined.

If the protocol information included in the received packet is included in the user account information in operation 202, whether network interface information included in the received packet is included in the user account information is determined in operation 204. For example, when the user ID included in the received packet is "Admin" and the protocol information included in the received packet corresponds to any one of protocols "HTTP", "SNMP", and "LPD" corresponding to "Admin", whether the network interface information included in the packet corresponds to "Interface 1", which is a network interface corresponding to "Admin", is determined.

If the network interface information is included in the set user account information in operation 204, the received packet is determined to be allowable in operation 206. However, if the user authentication information, the protocol information, or the network interface information is not included in the user account information in operations 200, 202, or 204, the received packet is determined to be unallowable in operation 208.

Returning to FIG. 1, if the received packet is allowable, an operation corresponding to the received packet is performed in operation 104. The operation requested by the received packet to the network image forming apparatus may be, for example, a printing operation, a scanning operation, a fax transmission operation, or the like. However, if the received packet is unallowable in operation 102, a message indicating that the received packet is unallowable may be displayed in operation 106. Such a message may be displayed on a display screen of the network image forming apparatus or printed onto a printable medium. According to other aspects of the present invention, the message can be output audibly. However, such a message need not be output in all aspects of the present invention.

Figure 6:
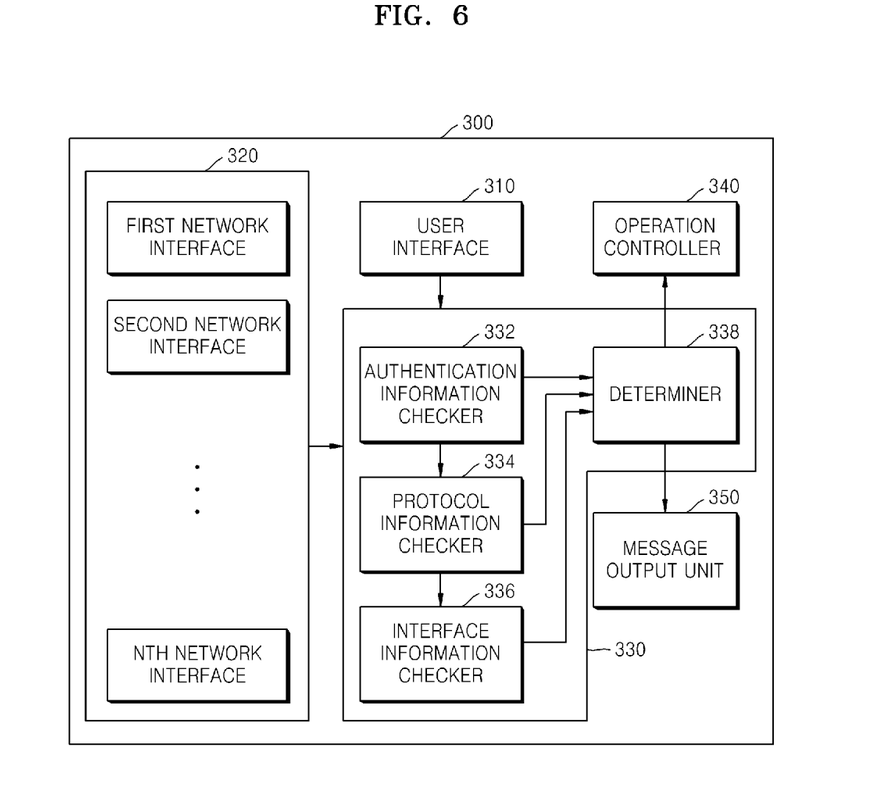
FIG. 6 is a block diagram illustrating an apparatus for allowing a packet in a network image forming apparatus according to an embodiment of the present invention.

FIG. 6 shows an apparatus 300 to allow a packet in a network image forming apparatus according to an embodiment of the present invention. The apparatus 300 includes a user interface 310, a plurality of network interfaces 320, a packet allowance determiner 330, an operation controller 340, and a message output unit 350. According to other aspects of the present invention, the apparatus 300 may include additional and/or different units; for example, the apparatus 330 may include a storage unit (not shown) to store user account information. Similarly, the functionality of two or more of the above units may be integrated into a single component. In addition, the apparatus 300 may be integrated into the network image forming apparatus or may be provided separately, such as part of a separate network server.

The user interface 310 sets user account information corresponding to the plurality of network interfaces 320. The user interface 310 displays an account setting screen to set user account information as illustrated in FIGS. 2 and 3. On the account setting screen, items that can input a user ID, a user password, a type of protocol, and a type of network interface are displayed. Other items may be displayed as well, in addition to those shown in FIGS. 2 and 3.

The user interface 310 registers information selected by a user via the account setting screen of FIG. 2 or 3 as the user account information. The user interface 310 sets at least one network interface or protocol that is allowable according to each user. Protocols and network interfaces may be independently set as shown in FIG. 2, or alternatively, protocols that are allowable in a predetermined network interface may be set as shown in FIG. 3. The user interface 310 outputs the registered user account information to the packet allowance determiner 330 according to request of the packet allowance determiner 330.

One or more of the plurality of network interfaces 320 receives an external packet, and outputs the received packet to the packet allowance determiner 330. As shown in FIG. 6, the plurality of network interfaces 320 includes first through Nth network interfaces. The number of network interfaces may differ according to a setting of a manufacturer and user of the network image forming apparatus. When the packet is received through one of the first through Nth network interfaces, the received packet is transmitted to the packet allowance determiner 330.

The packet allowance determiner 330 determines allowability of the packet using information included in the packet and the set user account information. When the packet is received, the packet allowance determiner 330 requests the user interface 310 for the user account information. The packet allowance determiner 330 determines the allowability of the packet by comparing the user account information and the information included in the packet. Accordingly, the packet allowance determiner 330 includes an authentication information checker 332, a protocol information checker 334, an interface information checker 336, and a determiner 338. While described as requesting the user account information from the user interface 310, the request can be made to a memory of the apparatus 300 storing the user account information in addition to, or instead of, requesting the user account information from the user interface 310.

The authentication information checker 332 checks whether user authentication information included in the packet is included in the set user account information. The authentication information checker 332 outputs a result of determining whether the user authentication information included in the packet is included in the user account information, to the protocol information checker 334. Alternatively, the authentication information checker 332 outputs a result of determining whether the user authentication information included in the packet is not included in the user account information to the determiner 338. In response to the result of determining whether the user authentication information is included in the user account information, the protocol information checker 334 determines whether protocol information included in the packet is included in the user account information.

The protocol information checker 334 outputs a result of determining whether the protocol information included in the packet is included in the user account information, to the interface information checker 336. Alternatively, the protocol information checker 334 outputs a result of determining whether the protocol information included in the packet is not included in the user account information to the determiner 338. In response to the result of determining whether the protocol information is included in the user account information, the interface information checker 336 determines whether network interface information included in the packet is included in the user account information, and outputs a result of checking to the determiner 338.

If the interface information checker 336 determines that the correct network interface information is included in the user account information, the determiner 338 determines that the packet is allowable, and outputs the result of determining that the packet is allowable to the operation controller 340. Alternatively, if the user authentication information, the protocol information, or the network interface information is not included in the user account information, the determiner 338 determines that the packet is unallowable, and outputs the result of determining that the packet is unallowable to the message output unit 350.

According to the result of determining of the packet allowance determiner 330, the operation controller 340 controls performance of an operation corresponding to the packet, such as a printing operation, a scanning operation, a fax transmission operation, or the like. Alternatively, according to the result of determining of the packet allowance determiner 330, the message output unit 350 outputs a message indicating that the packet is determined to be unallowable. The message output unit 350 displays the message on a display screen. Alternatively, the message output unit 350 may command a print engine (not shown) to output the message on a printable medium.

Figure 7:
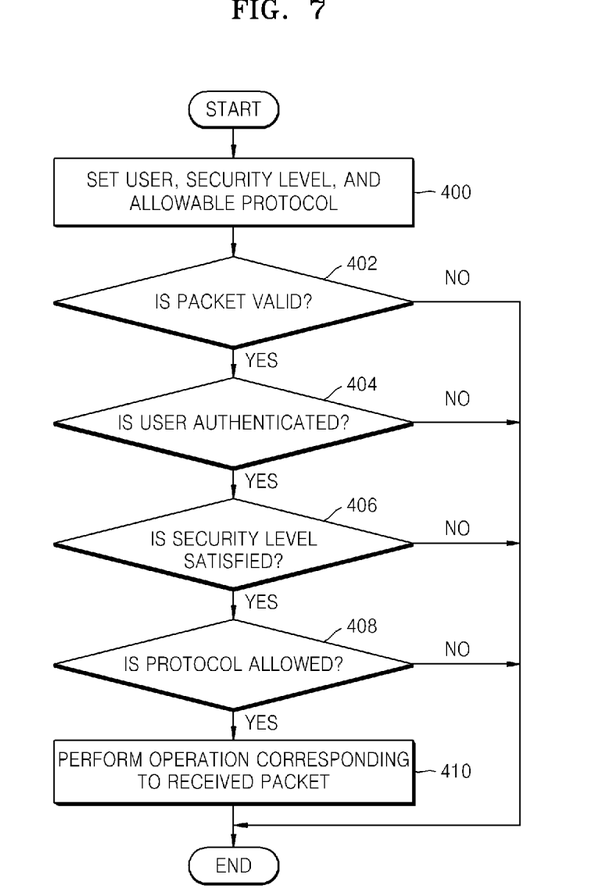
FIG. 7 is a flowchart illustrating a process of allowing a packet in a network image forming apparatus according to another embodiment of the present invention.

FIG. 7 is a flowchart of a process of allowing a packet in a network image forming apparatus according to another embodiment of the present invention. In operation 400, an allowable user, a security level, and an allowable protocol are pre-set via a user interface unit of the network image forming apparatus, which receives the packet. The setting may also be done on a computer in addition to, or instead of, at the network image forming apparatus.

Figure 8:
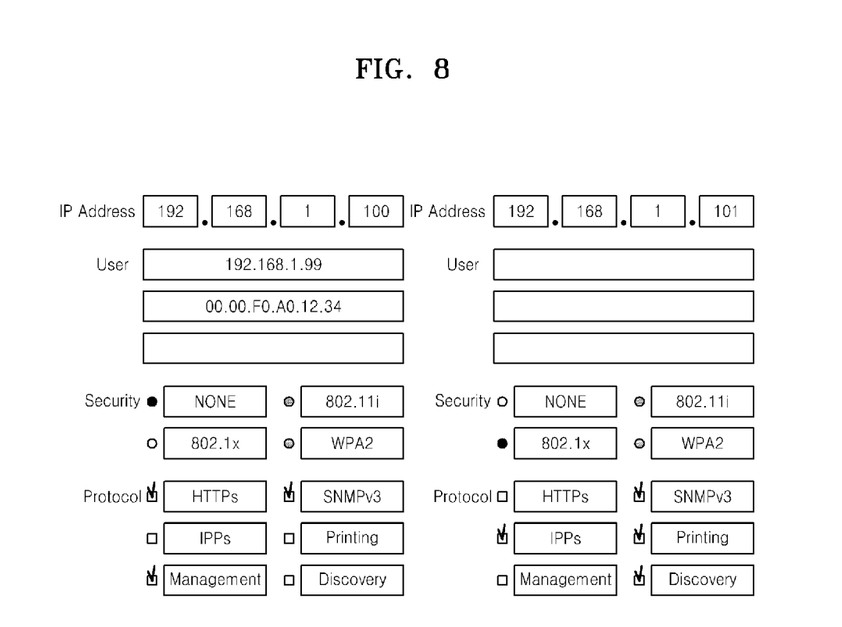
FIG. 8 is a diagram illustrating a user interface screen for pre-setting a user, a security level and protocol according to an embodiment of the present invention.

FIG. 8 is a diagram of a user interface screen for pre-setting a user, a security level and protocol according to an embodiment of the present invention. A network address of the network image forming apparatus, information for user authentication, and information about a security level and allowable protocol may be set up as shown in FIG. 8.

"IP Address" is a part that sets a plurality of network addresses (192.168.1.100 and 192.168.1.101). "User" is a part that sets a user, who can use the corresponding network address (192.168.1.100), by setting an IP address or a MAC address. Blanks are parts that can register additional users, and when nothing is set in the blanks, a user is not classified. "Security" denotes a security level when the network image forming apparatus, in which the corresponding network address is set, forms a link. "NONE" denotes a connection without security, "802.1x" denotes a wired interface, in which a link is formed using a 802.1x protocol, "802.11i" denotes a wireless interface, in which a link is formed using a 802.11i protocol, and "WPA2" denotes a wireless interface, in which a link is formed using WPA2. Other network interfaces for other wired and wireless networks, such as USB or Bluetooth, may also be included.

For example, a network address set as "NONE" allows a connection of the upper security of "802.1x", but a network address set as "802.1x" does not allow a connection to a channel that is not secured. Parts in black denote selected security levels, and parts in gray denote security levels that cannot be supported. When a wireless interface is used, the parts in gray (i.e., "802.11i" and "WPA2") can be set. "Protocol" is a part to set an allowable protocol through the corresponding network address. Only a protocol checked in a check box can communicate through the corresponding network address.

In the above example, the network address 192.168.1.100 is an administrator exclusive network address, and only a user (for example, an administrator who uses an IP address 192.168.1.99 or a MAC address 00.00.F0.A0.12.34) can manage information to allow a packet through a channel of HTTPs or SNMPv3. The administrator forms an environment that can be used by a user through the network address 192.168.1.100. Accordingly, the user network address 192.168.1.101 can be set through the administrator exclusive network address 192.168.1.100.

Returning to FIG. 8, validity of the packet received to the network image forming apparatus is determined in operation 402. The validity of the packet is determined based upon whether the packet includes a network address that is same as one of the plurality of network addresses in the network image forming apparatus. For example, when the packet includes a network address that is same as one of the plurality of network address (192.168.1.100 and 192.168.1.101) pre-set in FIG. 8, the packet is determined to be valid. However, when the packet does not include a network address that is the same as one of the plurality of pre-set network addresses (192.168.1.100 and 192.168.1.101), the packet is determined to be invalid.

If the packet is valid, whether a user who transmits the packet is an authenticated user is determined in operation 402. Operation 402 may be performed by checking whether a network address of the network image forming apparatus that transmits the packet is identical to pre-registered address information. Accordingly, an IP address and a MAC address are checked as the network address of the network image forming apparatus in order to check whether the user is an authenticated user. For example, as shown in FIG. 8, the IP address 192.168.1.99 and MAC address 00.00.F0.A0.12.34, which are information set for user authentication, are checked to determine whether the IP address and the MAC address are identical to an address of a network system that transmits the packet in order to determine whether the user is an authenticated user.

After operation 404, when the user is an authenticated user, a security level of the packet is checked in operation 406 by referring to a security level set in the network image forming apparatus. When the network image forming apparatus forms a link, which security level from among the security levels of "NONE", "802.1x", "802.11i", and "WPA2" the security level set in the network image forming apparatus is determined, and whether the packet has a security level above the corresponding security level of the network image forming apparatus is determined. When the security level set in the network image forming apparatus is "NONE", any valid packet is allowable. However, when the security level set in the network image forming apparatus corresponds to "802.1x", a packet having the security level over "802.1x" is allowed to be transmitted, but a packet having the security level lower than or equal to "802.1x" or a packet that is not secured is not allowed to be transmitted.

After operation 406, when the set security level is satisfied, whether a protocol used in the packet is identical to a protocol set in the network image forming apparatus that receives the packet is determined in operation 408. For example, as shown in FIG. 2, when the network image forming apparatus is set to allow only protocols HTTPs, IPPs, and SNMPv3, the packet is allowed to be networked only when the packet uses the above protocols.

After operation 408, if the protocol used in the packet is identical to the protocol set in the network image forming apparatus, an operation corresponding to the packet is performed in operation 410. If the packet is determined to be valid, the user is determined to be an authenticated user, and the security level and the protocol are satisfied in operations 402 through 408, an operation about the packet is performed. Such an operation may be a printing operation, a fax transmission operation, or the like.

Figure 9:
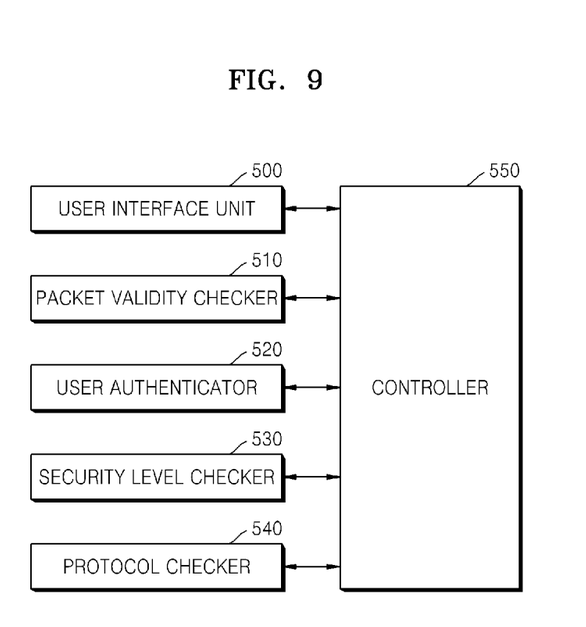
FIG. 9 is a block diagram illustrating an apparatus for allowing a packet in a network image forming apparatus according to another embodiment of the present invention.

FIG. 9 shows an apparatus to allow a packet in a network image forming apparatus according to another embodiment of the present invention. The apparatus includes a user interface unit 500, a packet validity checker 510, a user authenticator 520, a security level checker 530, a protocol checker 540, and a controller 550. According to other aspects of the present invention, the apparatus may include additional and/or different units. Similarly, the functionality of two or more of the above units may be integrated into a single component. The apparatus may also be integrated into a network image forming apparatus or provided separately.

The user interface unit 500 displays a user interface screen, which can pre-set a network address, a security level, and an allowable protocol, and sets information inputted through the displayed user interface screen as information for allowing packet reception. FIG. 8 is an example of a user interface screen displayed by the user interface unit 500.

When the network image forming apparatus receives a packet, the packet validity checker 510 determines whether the packet is valid. The packet validity checker 510 determines the validity of the packet based on whether the packet includes a network address that is same as one of a plurality of network addresses in a network system. For example, when the packet includes a network address that is the same as one of the plurality of pre-set network addresses (192.168.1.100 and 192.168.1.101) of FIG. 8, the packet validity checker 510 determines that the packet is valid. However, when the packet does not include a network address that is the same as the plurality of pre-set network addresses, the packet validity checker 510 determines that the packet is not valid.

In response to a result of the determination of the packet validity checker 510, the user authenticator 520 determines whether the user who transmits the packet is an authenticated user. The user authenticator 520 determines whether the user is an authenticated user based on whether a network address of the network image forming apparatus that transmits the packet is identical to pre-registered address information. The user authenticator 520 may check an IP address and a MAC address as the network address of the network image forming apparatus in order to determine whether the user is an authenticated user. For example, the user authenticator 520 checks whether the IP address 192.168.1.99 and a MAC address 00.00.F0.A0.12.34, which are information set for user authentication in FIG. 8, are identical to the network address of the network image forming apparatus in order to determine whether the user is authenticated.

In response to a result of the determination of the user authenticator 520, the security level checker 530 determines whether a security level of the packet satisfies a security level set in the network image forming apparatus. The security level checker 530 determines which security level from among "NONE", "802.1x", "802.11i", and "WPA2" the security level of the network image forming apparatus requires, and determines whether the security level of the packet is above the corresponding security level of the network image forming apparatus. If the security level set in the network image forming apparatus is "NONE", the security level checker 530 determines that any valid packet is allowable. However, when the security level corresponds to "802.1x", the security level checker 530 determines that the packet having the security level above "802.1x" satisfies the security level set in the network image forming apparatus, but when the packet has the security level lower than or equal to "802.1x" or the packet is not secured, the security level checker 530 determines that the packet does not satisfy the security level set in the network image forming apparatus.

In response to a result of the determination of the security level checker 530, the protocol checker 540 determines whether a protocol used in the packet is identical to a protocol set in the network image forming apparatus that receives the packet. For example, when the network image forming apparatus only allows protocols HTTPs, IPPs, and SNMPv3 as shown in FIG. 8, the protocol checker 540 determines whether the packet uses the setup protocol.

In response to a result of the determination of the protocol checker 540, the controller 550 controls the network image forming apparatus so as to perform an operation corresponding to the packet. After passing the packet validity check of the packet validity checker 510, the user authentication checking of the user authenticator 520, the security level check of the security level checker 530, and an allowable protocol check of the protocol checker 540, the controller 550 controls a network system so as to perform an operation requested by the packet.

Aspects of the present invention can be written as computer readable codes/instructions/programs and can be implemented in general-use digital computers that execute the programs using a computer readable recording medium. Examples of the computer readable recording medium include magnetic storage media (e.g., ROM, floppy disks, hard disks, magnetic tapes, etc.), optical recording media (e.g., CD-ROMs, or DVDs). Aspects of the present invention may also be embodied as carrier waves (e.g., transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Aspects of the present invention provide a method and apparatus for allowing a packet in the network image forming apparatus, which includes a plurality of network interfaces, set allowability of each interface according to each user, and thus provide an environment that allows each user to use various forms of interfaces. Aspects of the present invention also enable a user to set types of provided protocol according to each user, and thus a useful effect can be obtained in managing security of each user.

In addition, in a network image forming apparatus including at least one network address, transmission/reception of a packet can be restricted according to a security level even if the packet includes a valid network address. Accordingly, efficient operation of the network image forming apparatus is possible. Moreover, security of the network image forming apparatus can be strengthened.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of processing at least one packet in a network image forming apparatus including a plurality of network interfaces having different network addresses and different allowable services respectively, the method comprising:

setting an allowable service for each of the plurality of network interfaces;

receiving at least one packet through at least one network interface among the plurality of network interfaces;

comparing information included in the received packet with service information saved for network interface through which the packet is received; and performing an operation requested by the received packet when the operation requested by the received packet is determined to correspond with the allowable service set for the network interface through which the packet is received based on the comparing result, wherein the operation requested by the received packet is at least one of printing operation, scanning operation or faxing operation, wherein the plurality of network interfaces have different network addresses and different allowable services respectively, wherein the at least one packet includes an operation request, and the network interface is a path for receiving the operation request by receiving the at least one packet, wherein user account information which allows a plurality of users to use the plurality of network interfaces differently each other are saved in the network image forming apparatus, wherein the comparing information included in the received packet with service information saved for each network interface comprises comparing the information included in the received packet with the saved user account information, and wherein the user account information includes allowable protocol and allowable network interface for each user.

2. The method of claim 1, wherein the plurality of network interfaces comprises at least one wired network and at least one wireless network.

3. The method of claim 1, wherein protocol supported by each of the plurality of network interfaces is different with protocol supported by another one of the plurality of network interfaces.

4. The method of claim 1, wherein the comparing information comprising:
checking validity of the received packet; and
comparing a security level of the received packet with a security level set up in the network interface through which the packet is received.

5. The method of claim 4, wherein the checking of the validity of the received packet comprises determining whether the received packet includes network addresses that are the same as the network interface through which the packet is received.

6. The method of claim 4, when the received packet is a valid packet, further comprising determining whether a user who transmits the received packet is an authenticated use.

7. The method of claim 4, further comprising:
determining whether a protocol used in the received packet is identical to a protocol setup in the network interface through which the packet is received,
wherein, when the protocol used in the received packet is identical to the protocol setup in the network interface through which the packet is received, the operation requested by the received pack is performed.

8. A non-transitory computer readable recording medium having recorded thereon a program read by one or more computers to execute the method of claim 1.

9. The method of claim 1, wherein the plurality of network interfaces are network cards.

10. The method of claim 1, wherein the network addresses are at least one of IP (Internet Protocol) addresses or MAC (Media Access Control) addresses.

11. A network image forming apparatus comprising:
at least one processing device;
a plurality of network interfaces having different network addresses and different allowable services respectively to receive a packet by using the at least one processing device;
a user interface to set an allowable service for each of the plurality of network interfaces; and
an operation controller to compare information included in a packet received through one of the plurality of network interfaces with service information saved for a network interface through which the packet is received, and to perform an operation requested by the received packet when the operation requested by the received packet is determined to correspond with the allowable service set for the network interface through which the packet is received based on the comparing result,
wherein the operation requested by the received packet is at least one of printing operation, scanning operation or faxing operation,
wherein the packet includes an operation request, and the network interface is a path for receiving the operation request by the received packet,
wherein the user interface sets user account information for using the plurality of network interfaces differently for each of a plurality of users respectively,
wherein the operation controller compares information included in the received packet with the set user account information, and
wherein the user account information includes allowable protocol and allowable network interface for each user.

12. The apparatus of claim 11, wherein the plurality of network interfaces comprises at least one wired network and at least one wireless network.

13. The apparatus of claim 11, wherein protocol supported by each of the plurality of network interfaces is different with protocol supported by another one of the plurality of network interfaces.

14. The apparatus of claim 11, wherein the operation controller checks validity of the received packet, and compares a security level of the received packet with a security level set up in the network interface through which the packet is received, and performs an operation requested by the received packet when the operation requested by the received packet is determined the allowable service set for the network interface through which the packet is received based on the comparing result.

15. The apparatus of claim 14, wherein the operation controller checks the validity of the received packet by determining whether the received packet includes network addresses that are the same as the network interface through which the packet is received.

16. The apparatus of claim 14, wherein the operation controller determines whether a user who transmits the received packet is an authenticated user when the received packet is a valid packet.

17. The apparatus of claim 14, wherein the operation controller determines whether a protocol used in the received packet is identical to a protocol setup in the network interface through which the packet is received, and performs the operation requested by the received packet when the protocol used in the received packet is identical to the protocol setup in the network interface through which the packet is received.

18. The apparatus of claim 11, wherein the plurality of network interfaces are network cards.

19. The apparatus of claim 11, wherein the network addresses are at least one of IP (Internet Protocol) addresses or MAC (Media Access Control) addresses.

* * * * *